United States Patent [19]

Ziegler et al.

[11] Patent Number: 4,861,168
[45] Date of Patent: Aug. 29, 1989

[54] ELECTRONIC THERMOMETER

[75] Inventors: Horst Ziegler, Paderborn; Horst Behlen, Paderborn-Dahl, both of Fed. Rep. of Germany

[73] Assignee: W. C. Heraeus GmbH, Hanau, Fed. Rep. of Germany

[21] Appl. No.: 262,513

[22] Filed: Oct. 25, 1988

[30] Foreign Application Priority Data

Dec. 24, 1987 [DE] Fed. Rep. of Germany ....... 3744239

[51] Int. Cl.$^4$ .................. G01K 7/32; G01K 11/26
[52] U.S. Cl. .................... 374/117; 374/184; 331/66; 331/68; 310/344; 310/319
[58] Field of Search ............... 374/163, 183, 184, 117; 361/282; 331/58, 66, 68; 310/317, 319, 344, 348

[56] References Cited

U.S. PATENT DOCUMENTS

| | | | |
|---|---|---|---|
| 2,943,196 | 6/1960 | Eickhoff | 374/163 |
| 3,303,701 | 2/1967 | Hatsuura et al. | 374/184 |
| 3,474,267 | 10/1969 | Colberg | 310/317 |
| 3,796,968 | 3/1974 | Luscher | 310/344 |
| 3,969,640 | 7/1976 | Staudte | 310/344 |
| 4,468,583 | 8/1984 | Mori | 310/317 |
| 4,639,631 | 1/1987 | Chason et al. | 310/344 |
| 4,677,397 | 6/1987 | Nakayama et al. | 310/351 |
| 4,772,130 | 9/1988 | Ueda et al. | 374/117 |

FOREIGN PATENT DOCUMENTS 0041168 12/1981 European Pat. Off. .

Primary Examiner—William A. Cuchlinski, Jr.
Assistant Examiner—Diego F. F. Gutierrez
Attorney, Agent, or Firm—Frishauf, Holtz, Goodman & Woodward

[57] ABSTRACT

An electronic thermometer has an oscillator, the frequency determining element of which is a temperature sensitive piezoelectric element, used as a measuring sensor, which is located in a sealed housing of electrically insulating material. The piezoelectric element is provided with two terminal electrodes, which are each connected via a respective capacitor to the oscillator circuit, and each of the two capacitors has electrodes, one located inside and one located outside the housing.

10 Claims, 5 Drawing Sheets

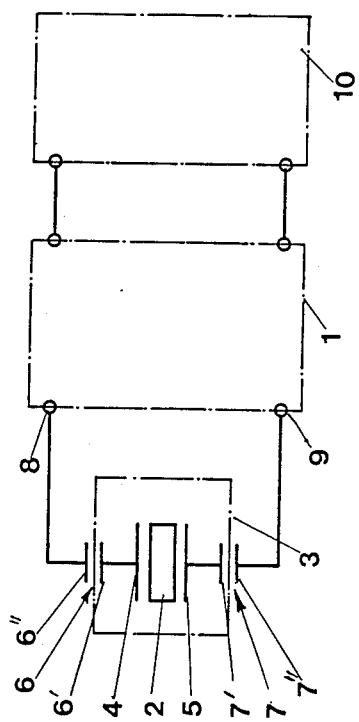

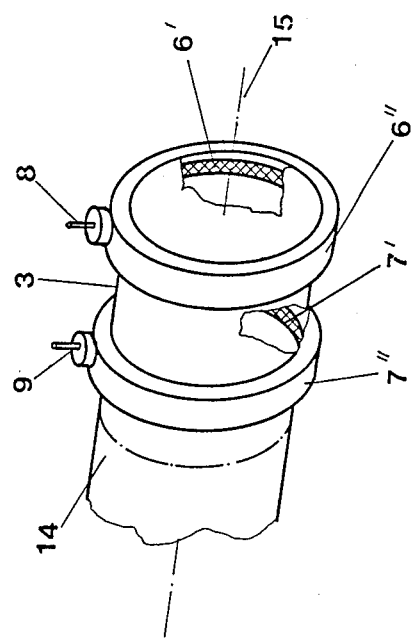

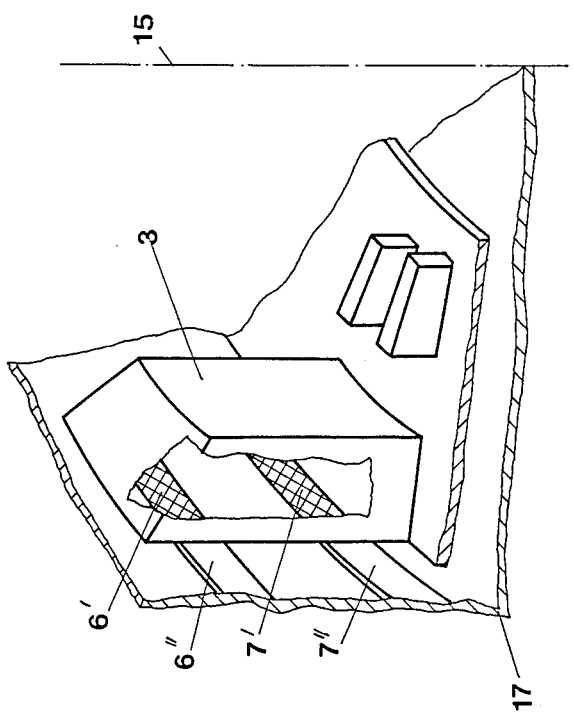

ELECTRONIC THERMOMETER

Cross-reference to related co-pending applications, the disclosures of which are hereby incorporated by reference, assigned to the assignee of the present application:

METHOD AND SYSTEM TO TRANSMIT SIGNALS BEING GENERATED BY A MEASURING SENSOR, AND SPECIFICALLY A TEMPERATURE SENSOR, Ser. No. 102,111, ZIEGLER et al., filed Sept. 29, 1987, claiming priority of German application No. P 36 33 939.3, filed Oct. 4, 1986.

SYSTEM FOR REMOTE SENSING OF A PHYSICAL PARAMETER, Ser. No. 143,567, ZIEGLER et al., filed Jan. 13, 1988, claiming priority of German application No. P 37 01 082.4, filed Jan. 16, 1987.

PULSE-GENERATING SENSOR UNIT FOR REMOTE SENSING SYSTEM, Ser. No. 172,702, ZIEGLER, filed Mar. 23, 1988, claiming priority of German application No. P 37 13 956.8, filed Apr. 25, 1987.

ELECTRONIC THERMOMETER, Ser. No. 262,512, ZIEGLER & BEHLEN, filed Oct. 25, 1988, claiming priority of German application No. P 37 44 196.5, filed Dec. 24, 1987.

The invention relates generally to electronic thermometers and more particularly to an electronic thermometer having an oscillator, the frequency-determining element of which is a temperature-sensitive piezoelectric element used as a measuring sensor having two terminals; one of the two terminal is galvanically separated from the oscillator circuit via a capacitor, and the oscillator circuit is in turn connected to an evaluation unit for detecting the temperature.

BACKGROUND

From European Patent No. 41 168, a temperature measuring sensor is known, having a quartz resonator as its temperature-sensitive element, which is accommodated in a sealed metal housing,. which has helium, for example, as a filling gas. The electrical line ducts leading through the housing wall are sealed off by glass sleeves that surround them and are electrically insulated from the housing wall.

In practice, the different thermal expansion coefficients and heat-sensitive insulating materials make such seals problematic, especially at higher temperatures, so that the line ducts limit the upper temperature measuring range of such temperature measuring sensors; also, such ducts are relatively expensive to produce.

THE INVENTION

It is the object of the invention to provide a hermetically sealed enclosure of the temperature- sensitive piezoelectric element for protecting it against aging due to external factors, which is relatively simple to manufacture and which enables an increase in the upper temperature limit to a range from 350° to 400° C.

In a preferred embodiment, the temperature-sensitive piezoelectric element is separated from the oscillator circuit by an electrically insulating housing wall; the terminals of the element are connected with two inner capacitor electrodes of relatively large surface area attached to the wall or disposed in the wall; the outer or counterelectrodes of the capacitor electrodes are located on the other side of the housing wall. These counterelectrodes can also be attached over a relatively large surface area to the housing wall, so that the housing wall at the same time serves as a dielectric of a thus-formed capacitor. However, with a flat housing wall it is also possible to locate the outer or counterelectrodes such that they are movable in translation, so that for test purposes, for instance, they can successively connect a great number of piezoelectric elements, by displacement, to a single oscillator circuit. The piezoelectric element can also be accommodated in a rotatable housing, and its terminals can be connected with annular or cylindrical-jacket-like electrodes located axially beside one another; the capacitive arrangement is provided by suitably formed stationary counterelectrodes in the form of cylinder jackets or jacket segments. As the piezoelectric element, a quartz resonator is preferably used, its angles of intersection being selected such that the inherent mechanical resonance frequency of the quartz is dependent on the temperature. However, a crystal or a ceramic can also be used as the temperature-sensitive piezoelectric element.

The opportunity of disposing the hermetically sealed temperature-sensitive piezoelectric in aggressive media, such as electrolytes in electrolysis systems, proves to be particularly advantageous; the electronically sensitive parts of the oscillator circuit are located outside the electrolytic trough or electrolysis cell. Another advantage is that the piezoelectric element can be disposed on the rotor of rotating shafts, in order to measure the winding temperature in electric machines, or for measurement in the plane of the sample in rotating weathertesting equipment, without requiring a conductive connection via slip rings or some kind of radio connection for this purpose. It proves to be particularly advantageous that other than the piezoelectric element, no electronic components whatever, with their limited temperature range, are located in the rotating part, an advantage not found in cases where external auxiliary energy is supplied into the rotating part optically or inductively. DRAWINGS FIG. 1 shows the fundamental mode of operation of the subject of the invention;

FIGS. 2a and 2b show a detail illustrating the structural principle of duct-free signal transmission; and FIGS. 3 and 4 illustrate the application of the invention to rotating systems.

DETAILED DESCRIPTION

Figure 2A:
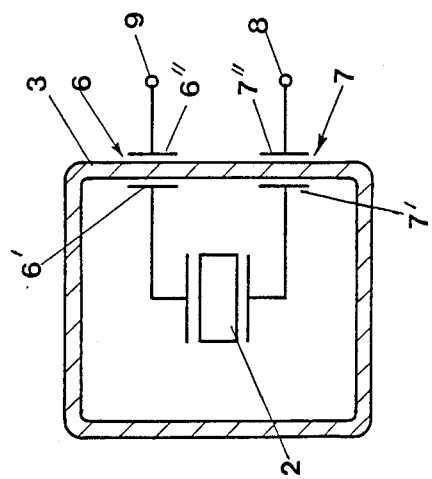

According to FIG. 1, the piezoelectric element acting as the frequency determining element of an oscillator 1 is located in a hermetically sealed housing 3. The electrodes 6′, 7′ of the capacitors 6, 7, which are connected to the terminals 4, 5 of the piezoelectric element 2, are located on the inside of the housing 3, while the electrodes of the capacitors 6, 7 that are connected to the input terminals 8, 9 of the oscillator circuit 1 are located on the outside of the housing 3. The housing wall located between the electrodes of the two capacitors 6, 7 thus acts as the dielectric, or as part of the dielectric, of the capacitors. An evaluation unit 1 is connected to the oscillator circuit, and from the oscillator frequency it detects the temperature and indicates it, or prepares it for further processing. The temperature can be ascertained for instance by comparing the measured oscillator frequency with the frequency of a second oscillator, which emits a signal that is not dependent on the temperature.

FIG. 2a is a cross section through a hermetically sealed housing 3, which contains a schematically shown piezoelectric element 2. To avoid aging of the piezoelectric element, the housing is filled with a pure gas or a gas mixture, for instance a nitrogen-helium mixture. The terminals 4, 5 of the piezoelectric element 2 are connected to the inner electrodes 6', 7', located in the housing 3, of the capacitors 6, 7, the outer electrodes 6", 7" of which are disposed directly opposite the inner electrodes on the outside surface of the housing 3. The housing is made entirely of temperature-proof material, and insulating material is provided at least in the vicinity of the capacitors 6, 7. In practice, glass, quartz glass or ceramic have proved to be particularly suitable as housing materials.

Figure 2B:
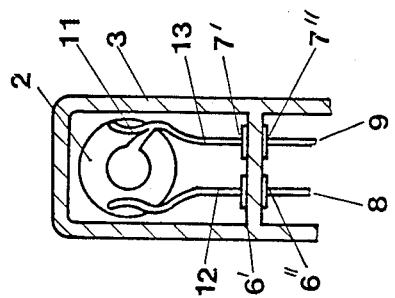

FIG. 2b shows in cross section a housing having a piezoelectric element, which can be used in practice as a measuring sensor. The piezoelectric element 2 is located in a holder 11, the electrically conductive holder elements 12, 13 of which are directly connected to the terminals of the electrodes of the element 2. The ducting of the oscillator signal, as already explained in connection with FIG. 2a, takes place via the capacitors 6, 7, the inner electrodes of which are connected to the terminals 4, 5, while the outer electrodes are connected to the terminals 8, 9 leading to the oscillator circuit.

FIG. 3 shows the use of the electronic measuring system according to the invention in a rotating test object, as represented for instance by a rotating shaft. The piezoelectric element is for instance accommodated in its housing 3 on the end of a shaft 14 having an axis of rotation 15; the inner electrodes 6', 7' are formed as annularly revolving parts of a cylinder jacket. The housing 3 is surrounded on the outside by stationary outer electrodes 6", 7", likewise formed annularly, each of which, together with the inner electrodes, forms a respective capacitor system 6, 7. However, instead of using the annularly circumferential outer electrodes 6", 7", it is also possible to use segments that encompass only a portion of the circumference. The outer electrodes are connected to the oscillator circuit via the terminals 8 and 9.

By the same principle, it is possible to accommodate a piezoelectric element as a temperature measuring sensor on the rotor of an electric machine; the transmission from the rotating shaft to the stationary oscillator functions by the same principle described in connection with FIG. 3. It is possible here to provide a housing in the form of an annular jacket, which is slipped onto the shaft so that the shaft ends can each rest in a bearing.

It is also possible, as shown in FIG. 4, to use the hermetically sealed piezoelectric element in the sample plane of a sample holder, rotating about an axis 15, in a weather-testing apparatus, with the various heat sources along the orbit acting upon the measuring sensor. As the detail of such a weather testing apparatus shows, the stationary housing wall 17 has two circumferential annular outer capacitor electrodes 6", 7", disposed axially relative to one another, which serve as counterelectrodes to the inner electrodes 6', 7' located on the holder in the housing 3; in this case, the electrodes 6', 7' take the form of jacket segments. In this way, especially in long-term tests, it is possible to dispense with electronic thermometers having their own power supply.

Various changes and modifications may be made, and features described in connection with any one of the embodiments may be used with any of the others, within the scope of the inventive concept.

We claim:

1. An electronic thermometer having
   a generally cylindrical rotatable sealed housing (3) of electrically insulating material;
   a temperature-sensitive piezoelectric element (2) with a mechanical resonance frequency which is temperature-dependent, located in said housing (3), said element including a pair of terminals (4,5);
   an oscillator circuit (1), having a pair of oscillator input terminals (8, 9) galvanically separated from said rotatable housing and piezoelectric element, and an output;
   evaluation unit means (0) for detecting temperature, connected to said oscillator output;
   a respective inner capacitor electrode (6', 7') located adjacent an outer wall of said rotatable housing (3) and connected to a respective one of said piezoelectric element terminals (4,5), and
   a respective outer capacitor electrode (6", 7") separated from said rotatable housing (3) and connected to a respective one of said oscillator input terminals (8,9),
   said inner (6' 7') and outer (6", 7") capacitor electrodes together defining a pair of capacitors (6,7) which transmit a temperature-dependent signal from said piezoelectric element (2) to said oscillator circuit (1), thus directly specifying the oscillation frequency thereof, while providing said galvanic separation therebetween.

2. An electronic thermometer as defined by claim 1, wherein a crystal is used as the temperature-sensitive piezoelectric element (2).

3. An electronic thermometer as defined by claim 1, wherein a quartz oscillator is used as the temperature-sensitive piezoelectric element (2).

4. An electronic thermometer as defined by claim 1, wherein the housing (3) consists substantially of a material selected from the group consisting of glass, quartz glass and ceramic.

5. An electronic thermometer as defined by claim 1, wherein the electrodes located outside the housing (3) of the two capacitors are movable relative to their respective inner electrodes.

6. An electronic thermometer as defined by claim 1, wherein the terminal electrodes (4, 5) of the piezoelectric element (2) are connected to two electrodes (6', 7') having a surface area located on or in the wall of the housing (3), the counterelectrodes (6", 7") of which electrodes are located on the other side of the housing wall.

7. An electronic thermometer as defined by claim 6, wherein the outer electrodes (6", 7") are disposed opposite the inner electrodes (6', 7') firmly on the other side of the housing wall.

8. An electronic thermometer as defined by claim 6, wherein the housing (3) has cylindrically symmetrical shape and can be mounted on a rotatable shaft, the inner electrodes (6', 7') are formed as annular jackets axial relative to one another, and wherein the counter electrodes (6", 7") of the inner electrodes are at least partly formed as stationary annular jackets, which surround the housing (3).

9. An electronic thermometer as defined by claim 8, wherein the outer electrodes (6", 7") are formed as ring segments.

10. An electronic thermometer as defined by claim 8, wherein
   the inner electrodes (6', 7') are formed as ring segments, movable along a circular path, of said housing (3)
   said outer electrodes (6", 7") encompass said circular path.

* * * * *